(12) United States Patent
Gantt et al.

(10) Patent No.: US 7,131,369 B2
(45) Date of Patent: Nov. 7, 2006

(54) DRAWER AND LATCHING MECHANISM FOR POSITIONING AND SECURING A POD BELOW THE BREW HEAD OF A BEVERAGE BREWER

(75) Inventors: Timothy D. Gantt, Goshen, KY (US); William A. Dahmen, Goshen, KY (US); William A. Reuss, Jr., Taylorsville, KY (US); Kenton J. Graviss, Louisville, KY (US); David Waynescott, New Albany, IN (US); Robert Lewis Mallory, Sammamish, WA (US); Kwong Shing Wong, Tuen Mun (HK); David Lee Vergara, Oconomowoc, WI (US)

(73) Assignee: Grindmaster Corporation, Louisville, KY (US)

( * ) Notice: Subject to any disclaimer, the term of this patent is extended or adjusted under 35 U.S.C. 154(b) by 0 days.

(21) Appl. No.: 11/166,589

(22) Filed: Jun. 24, 2005

(65) Prior Publication Data

US 2006/0021514 A1 Feb. 2, 2006

Related U.S. Application Data

(60) Provisional application No. 60/641,401, filed on Jan. 4, 2005, provisional application No. 60/591,431, filed on Jul. 27, 2004.

(51) Int. Cl.
*A47J 31/00* (2006.01)

(52) U.S. Cl. .................... 99/289 R; 99/295; 99/300; 99/302 R

(58) Field of Classification Search ............ 99/289 R, 99/295, 300, 302 R; 220/263, 862, 810; 292/152, 150, DIG. 11, 180, 179, 137
See application file for complete search history.

(56) References Cited

U.S. PATENT DOCUMENTS

| 4,377,303 | A | * | 3/1983 | McPherson | 292/152 |
| 6,009,792 | A | * | 1/2000 | Kraan | 99/295 |
| 6,115,239 | A | * | 9/2000 | Kim | 361/681 |
| 6,990,891 | B1 | * | 1/2006 | Tebo, Jr. | 99/295 |
| 2005/0103202 | A1 | * | 5/2005 | Rahn et al. | 99/279 |

* cited by examiner

Primary Examiner—Reginald L. Alexander
(74) Attorney, Agent, or Firm—Stites & Harbison, PLLC; David W. Nagle, Jr.

(57) ABSTRACT

A drawer and latching mechanism for a beverage brewer, and preferably, a brewer that utilizes a pod of coffee grounds or another beverage component, has a housing of the brewer including a pivotable cover and a drawer for retaining a pod of a beverage component below the brew head. In an open position, the pivotable cover and brew head are pivoted away from the drawer to allow access to the pod, while in a closed position, the pivotable cover and brew head are pivoted toward and locked relative to the drawer to secure the pod below the brew head for brewing.

8 Claims, 14 Drawing Sheets

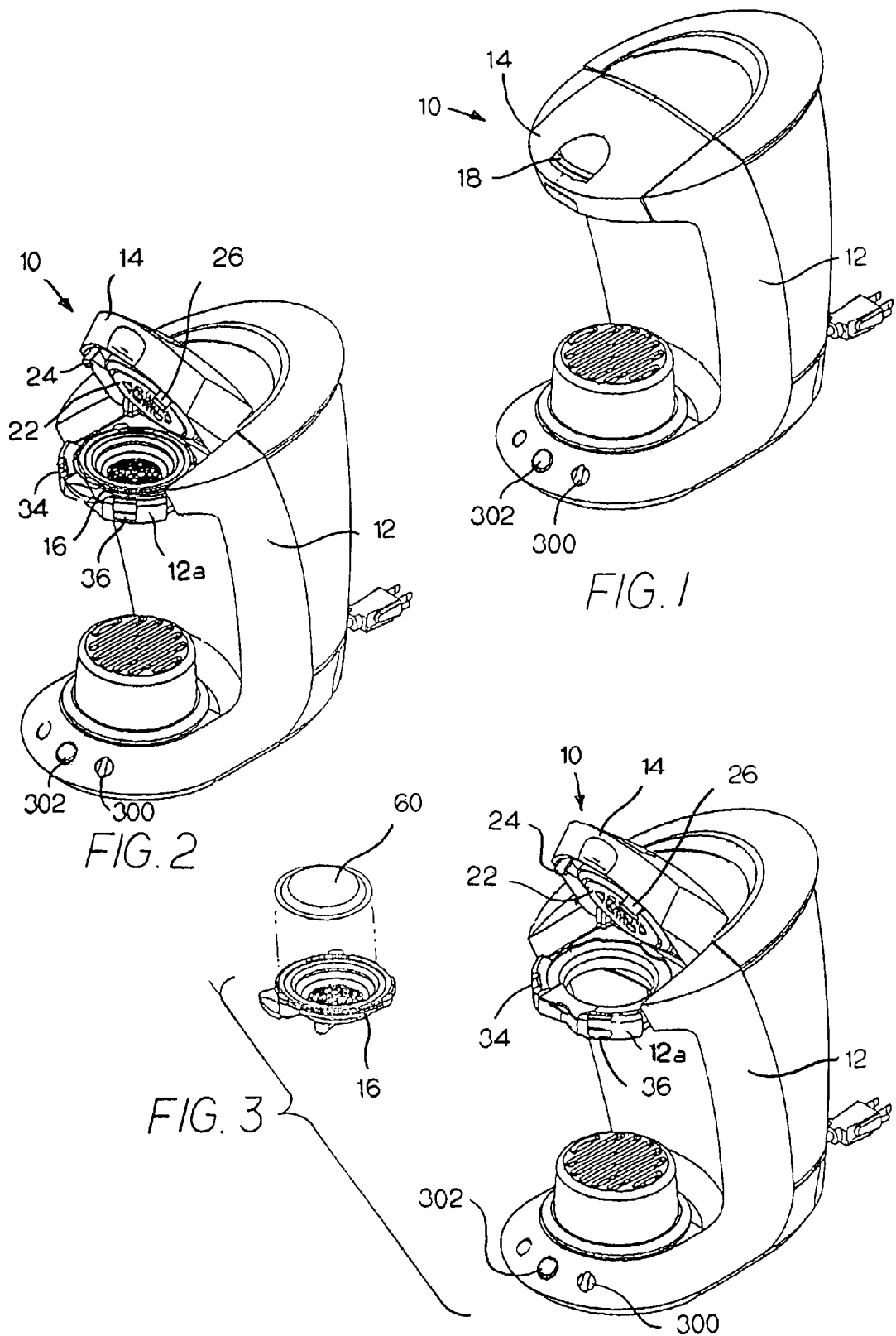

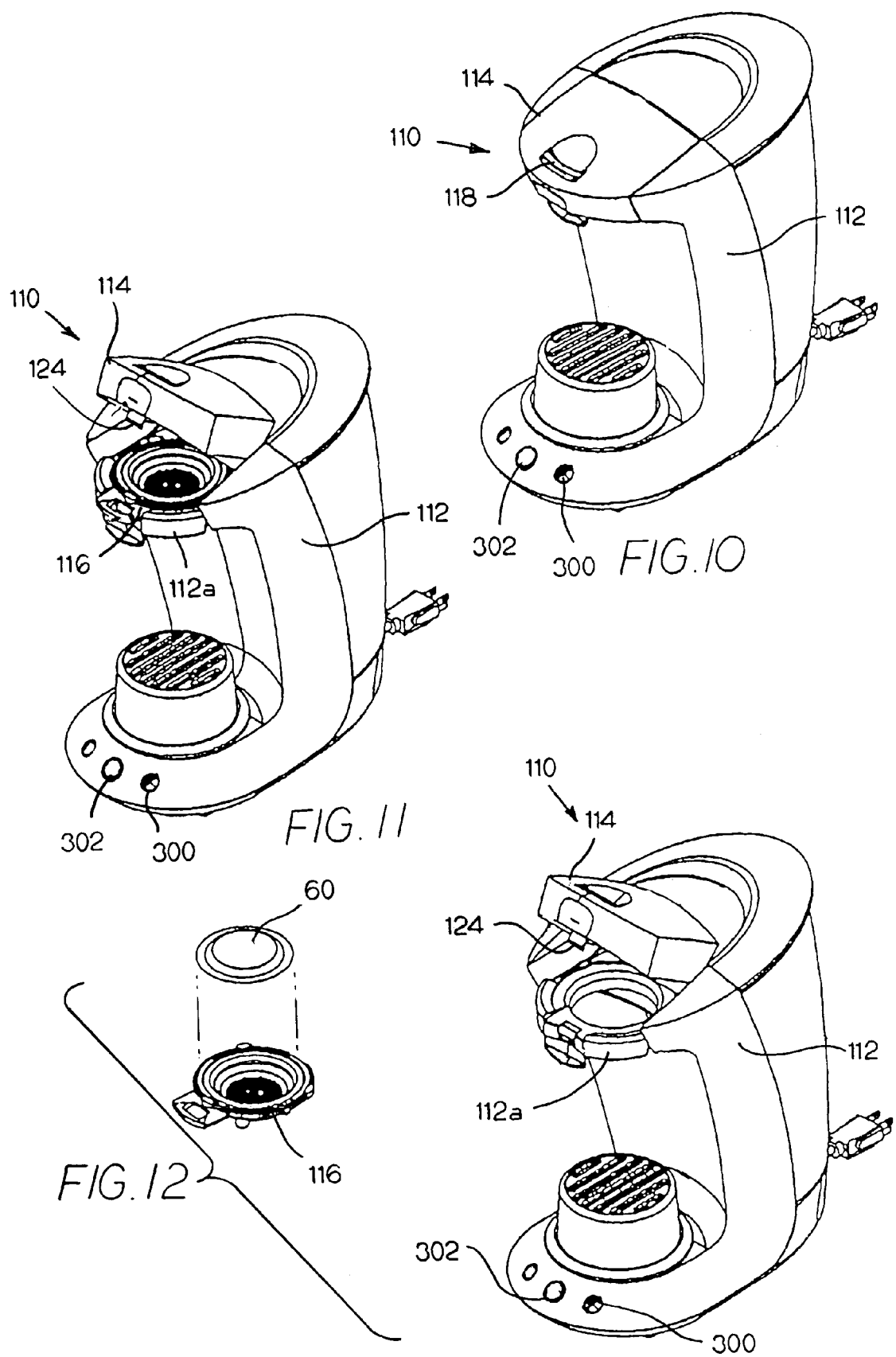

DRAWER AND LATCHING MECHANISM FOR POSITIONING AND SECURING A POD BELOW THE BREW HEAD OF A BEVERAGE BREWER

CROSS-REFERENCE TO RELATED APPLICATIONS

The present application claims priority to U.S. Provisional Patent Application Ser. No. 60/591,431 filed on Jul. 27, 2004 and U.S. Provisional Patent Application Ser. No. 60/641,401 filed on Jan. 4, 2005, the entire disclosures of which are incorporated herein by reference.

FIELD OF THE INVENTION

The present invention relates to beverage brewers, and, more particularly, to a drawer and latching mechanism for positioning and securing a pod enclosing a beverage component, such as coffee grounds or tea, below a brew head of a beverage brewer for brewing.

BACKGROUND OF THE INVENTION

In brewing coffee or similar beverages, each consumer has his or her own taste preferences. In response, as an alternative to traditional multi-cup brewers, there have been efforts to develop brewers that use a single-serve pod. Thus, an individual consumer can brew a single serving of coffee or another beverage, and furthermore, has some flexibility in determining the relative strength of the brewed beverage. When using such a pod, however, the proper positioning of the pod relative to the brew head is important in ensuring the dispensing of a high quality beverage.

SUMMARY OF THE INVENTION

The present invention is a beverage brewer with a drawer and latching mechanism that positions and secures a pod of coffee grounds or another beverage component relative to the brew head for optimum brewing, while also facilitating loading and unloading of the pod. Such a pod is generally manufactured from two substantially circular sections of filtering paper joined along their respective circumferential edges and enclosing a quantity of beverage component. Such pods are commonly designed for and contain a quantity of beverage component suitable for a single serving of the brewed beverage. Hot water is then distributed over and through the pod and enclosed beverage component, and the brewed beverage is dispensed through an outlet and into a cup or similar receptacle. In accordance with the teachings of the present invention, the housing of the brewer includes a pivotable cover and a drawer for retaining a pod of a beverage component below the brew head, wherein, in an open position, the pivotable cover and brew head are pivoted away from the drawer to allow access to the pod, while in a closed position, the pivotable cover and brew head are pivoted toward and locked relative to the drawer to secure the pod below the brew head for brewing.

In one exemplary embodiment of the present invention, to open and pivot the cover to gain access to the pod requires an individual to move a release slide on the upper surface of the cover. Movement of the release slide causes a forward movement of two spring-biased latches that are secured to the upper surface of the brew head, and thus, a disengagement of downwardly extending appendages of these latches from slots defined by the drawer of the housing, allowing the cover and brew head to be pivoted rearwardly into an open position. Of course, once the pod has been replaced, the cover and brew head can be returned to a closed position. And, because the latches are spring-biased, they will return to the locked position, securing the pod in an appropriate position below the brew head.

In another exemplary embodiment of the present invention, to open and pivot the cover to gain access to the pod requires an individual to move a release slide on the upper surface of the cover. However, in this embodiment, as the release slide is manipulated from its biased, rearward position to a forward position, the engagement of the release slide with two upwardly extending appendages of a single latch causes a similar movement of the latch, such that a downwardly extending appendage of the latch disengages from the drawer of the housing and allows the cover and brew head to be pivoted into an open position.

DESCRIPTION OF THE DRAWINGS

FIG. 1 is a perspective view of an exemplary brewer made in accordance with the present invention, with the pivotable cover in a closed position;

FIG. 2 is a perspective view of the exemplary brewer of FIG. 1, with the pivotable cover and brew head in an open position;

FIG. 3 is a perspective view of the exemplary brewer substantially identical to FIG. 2, but with the pod holder removed from the brewer;

FIG. 10 is a perspective view of another exemplary brewer made in accordance with the present invention, with the pivotable cover in a closed position;

FIG. 11 is a perspective view of the exemplary brewer of FIG. 10, with the pivotable cover and brew head in an open position;

FIG. 12 is a perspective view of the exemplary brewer substantially identical to FIG. 11, but with the pod holder removed from the brewer;

DETAILED DESCRIPTION OF THE INVENTION

The present invention is a beverage brewer with a drawer and latching mechanism that positions and secures a pod of coffee grounds or another beverage component relative to the brew head for optimum brewing, while also facilitating loading and unloading of the pod. Such a pod is generally manufactured from two substantially circular sections of filtering paper joined along their respective circumferential edges and enclosing a quantity of beverage component. Such pods are commonly designed for and contain a quantity of beverage component suitable for a single serving of the brewed beverage.

As with traditional brewers, a brewer made in accordance with the present invention includes a plumbing system in which water is drawn from a water reservoir (or from another water source). As water is drawn from the reservoir and into a hot water tank, hot water is forced from the hot water tank to a brew head. The brew head distributes the hot water over and through the pod and enclosed beverage component, and the brewed beverage is dispensed through an outlet and into a cup or similar receptacle.

The focus of the present invention, however, is not on the plumbing details, but rather on the positioning of the pod below the brew head. In accordance with the teachings of the present invention, the housing of the brewer includes a pivotable cover and a drawer for retaining a pod of a beverage component below the brew head, wherein, in an open position, the pivotable cover and brew head are pivoted away from the drawer to allow access to the pod, while in a closed position, the pivotable cover and brew head are pivoted toward and locked relative to the drawer to secure the pod below the brew head for brewing.

Figure 4:
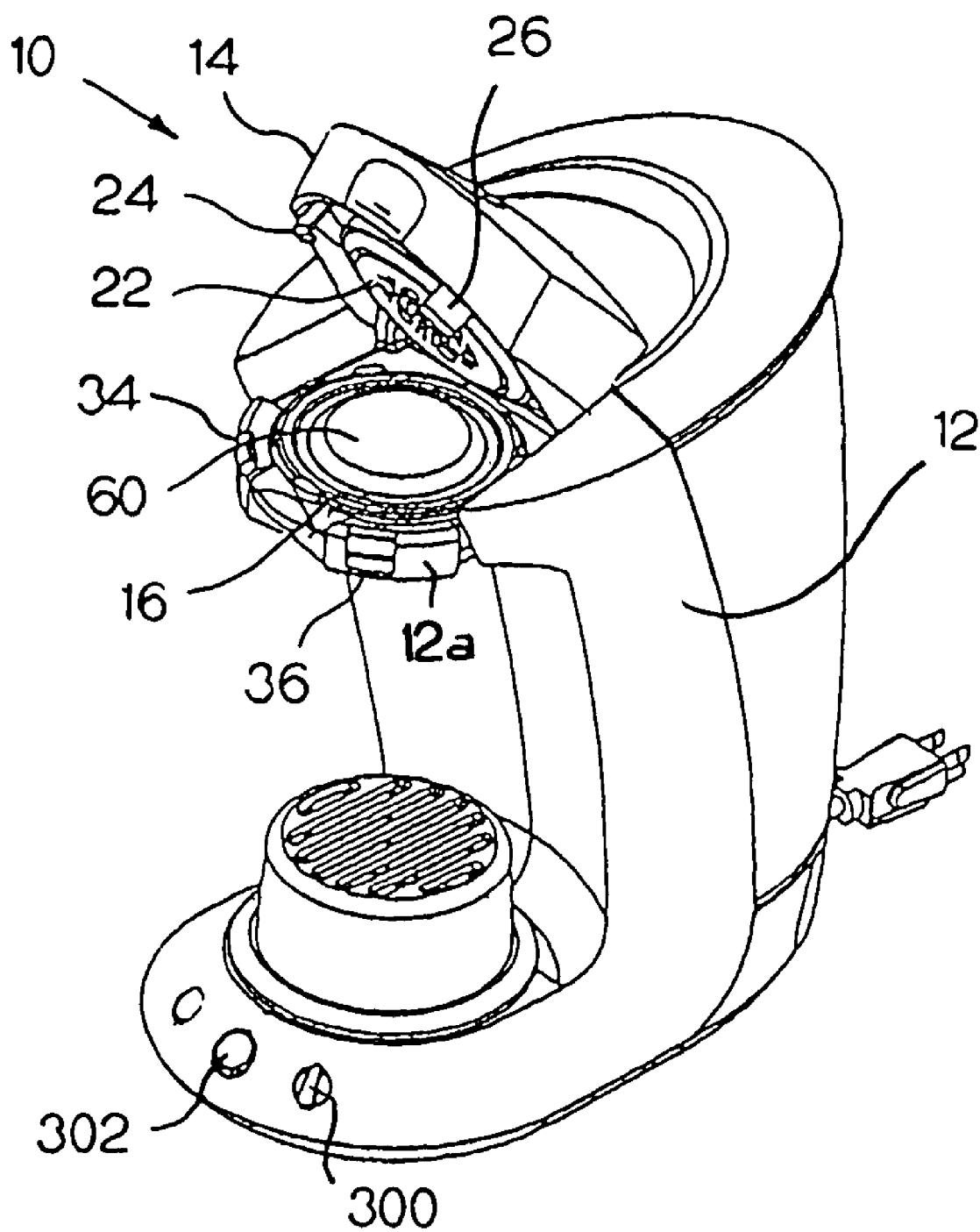
FIG. 4 is a perspective view of the exemplary brewer substantially identical to FIG. 2, but with a pod containing a beverage component received in the pod holder.

Referring now to FIGS. 1–4, an exemplary brewer 10 made in accordance with the present invention has a housing 12 that includes a pivotable cover 14. Opening and pivoting the cover 14, along with the brew head 22 (which is secured to and pivots with the cover 14), allows access to a portion of the housing, a so-called drawer 12a, that retains the pod 60 in a pod holder 16 below the brew head 22. As best illustrated in FIG. 3, the drawer 12a defines a substantially circular opening designed to receive the pod holder 16. Accordingly, when the cover 14 is open, the pod holder 16 can be removed from the brewer 10 to replace the pod. Once the pod 60 has been placed in the pod holder 16 and the pod holder 16 returned to the brewer 10, as illustrated in FIG. 4, the cover 14 and brew head 22 can be pivoted into a closed position so that the brewing process can commence.

Before discussing the further details of the positioning of the pod 60 below the brew head 22, reference is made to FIG. 20, which is a schematic view of one example of a plumbing system for the exemplary brewer 10. This plumbing system is substantially contained within the housing 12. In this exemplary embodiment and as described in co-pending U.S. patent application Ser. No. 10/894,783 (which is incorporated herein by reference), the brewer 10 is designed to allow a consumer to select a desired strength of the brewed beverage. This selection by the consumer is preferably accomplished using a selector switch 300 on the front surface of the housing 12. A consumer selects the appropriate setting by rotating the selector switch 300 to a desired position, and then presses a "brew" button 302 to initiate the brewing process.

Figure 20:
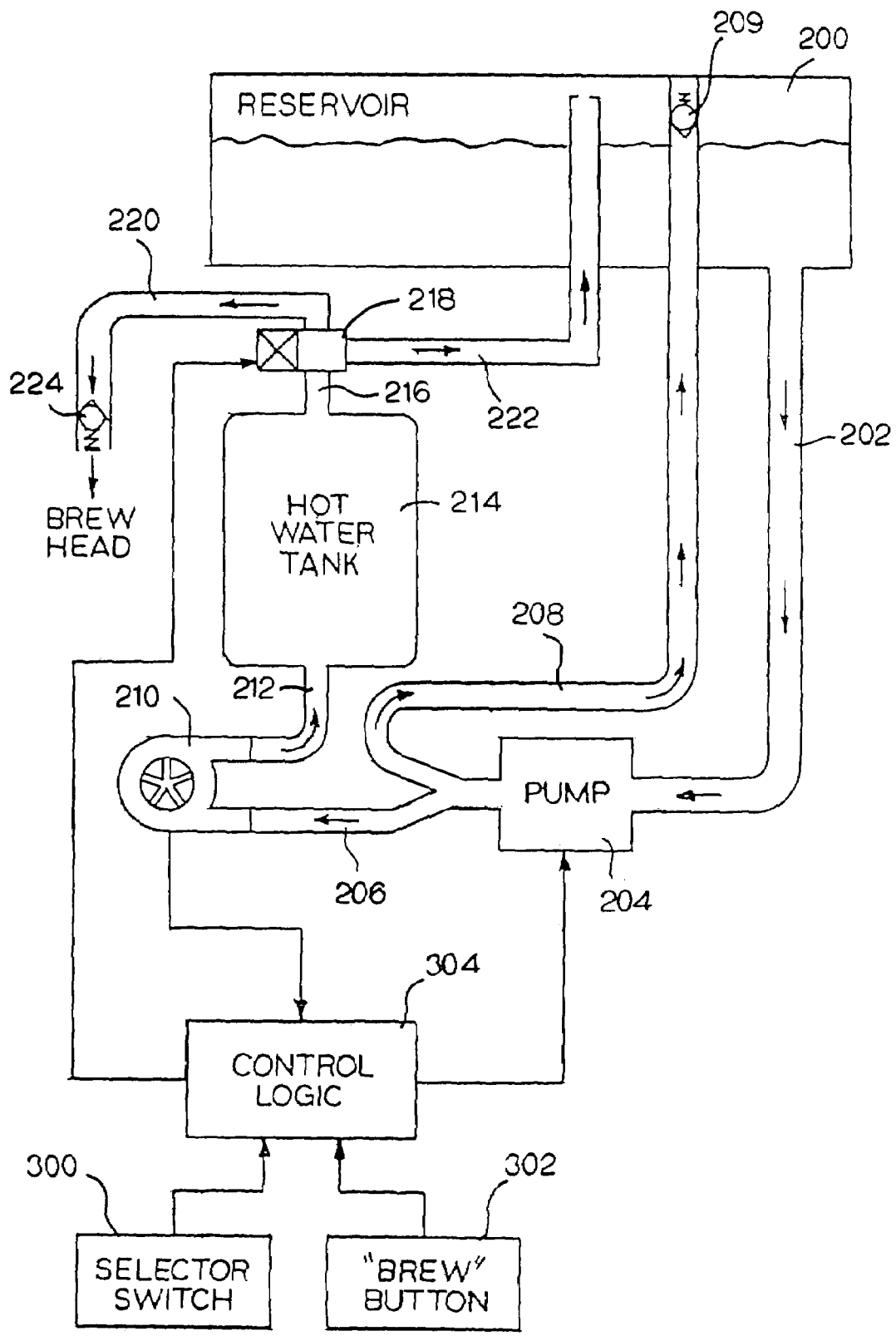
FIG. 20 is a schematic view of one example of a plumbing system for the exemplary brewer 10.

Referring still to FIG. 20, potable water is stored in and drawn from a water reservoir 200 through a length of tubing 202 via a pump 204. In this regard, although a pump is an example of a means by which to move water through the brewer 10, it is contemplated that water flow could be induced through gravity or other techniques without departing from the spirit and scope of the present invention. Furthermore, as with all tubing described in the present application, the length of tubing 202 may be made of a silicone or similar flexible, food-grade material. In any event, the pump 204 is activated in response to an action of the consumer, specifically the selection of a beverage strength using the selector switch 300 and depression of the "brew" button 302 on the front surface of the housing 12 of the brewer 10. Furthermore, the brewer 10 includes a control logic 304 that receives signals from the selector switch 300 and the "brew" button 302. Based on these signals and other inputs, the control logic 304 operates the pump 204 and other components of the brewer 10, as further described in co-pending U.S. patent application Ser. No. 10/894,783. As the water passes through the pump 204, it is directed to a hot water tank 214, which heats the water to a desired temperature. Specifically, in this example, the water exiting the pump 204 is directed through a length of tubing 206 to a flow meter 210. By using a flow meter 210 to measure volumetric flow, a precise, predetermined volume of water can be measured and delivered to the hot water tank 214, which, in turn, causes a precise, predetermined volume of hot water to be forced from the hot water tank 214 and delivered to the brew head 22. Also, with respect to the flow meter 210, the measurement data can be also communicated to the control logic 304 so that the pump 204 can be de-activated to terminate the water flow through the brewer 10 at the appropriate time.

With respect to the flow of water from the pump 204 to the flow meter 210, it should also be noted that, in this exemplary embodiment, there is an additional length of tubing 208 which branches off from the length of tubing 106 before the water enters the flow meter 210. This additional length of tubing 218 extends into the water reservoir 200, where it terminates in a check valve 209. This allows for a pressure release should the pressure between the pump 204 and flow meter 210 exceed a predetermined level.

After the water exits the flow meter 210, it passes through another length of tubing 212 into the bottom of the hot water tank 214. As the substantially room-temperature, potable water is introduced into the lower portion of the tank 214, hot water is forced from the upper portion of the tank 214 through yet another length of tubing 216 to a three-way solenoid valve 218 that controls flow to the brew head 22. Assuming the solenoid valve 218 is open, water passes through the solenoid valve 118 into a another length of tubing 220, which delivers the hot water to the brew head 22, and the hot water is then distributed over the pod 60 and enclosed beverage component, with the resultant brewed beverage then being dispensed into a cup or similar container.

Furthermore, in this exemplary embodiment and as illustrated in FIG. 20, a check valve 224 may be provided near the inlet to the brew head 22 to create a slight back-pressure that minimizes dripping from the tube 220 from the solenoid valve 218 to the brew head 22. There is also another length of tubing 222 extending from the solenoid valve 218 and into the water reservoir 200, such that excess pressure caused by the heating of the water in the tank 214 can be vented to the reservoir 200.

In any event, and as mentioned above, the focus of the present invention is not on the plumbing details, but rather on the positioning of the pod 60 below the brew head 22. Indeed, various plumbing systems may be used to move water through the brewer without departing from the spirit and scope of the present invention.

Returning to FIGS. 1–4, in this exemplary embodiment, to open and pivot the cover 14 (and the brew head 22) to gain access to the drawer 12a and pod holder 16 requires an individual to move a release slide 18 on the upper surface of the cover 14.

Figure 5:
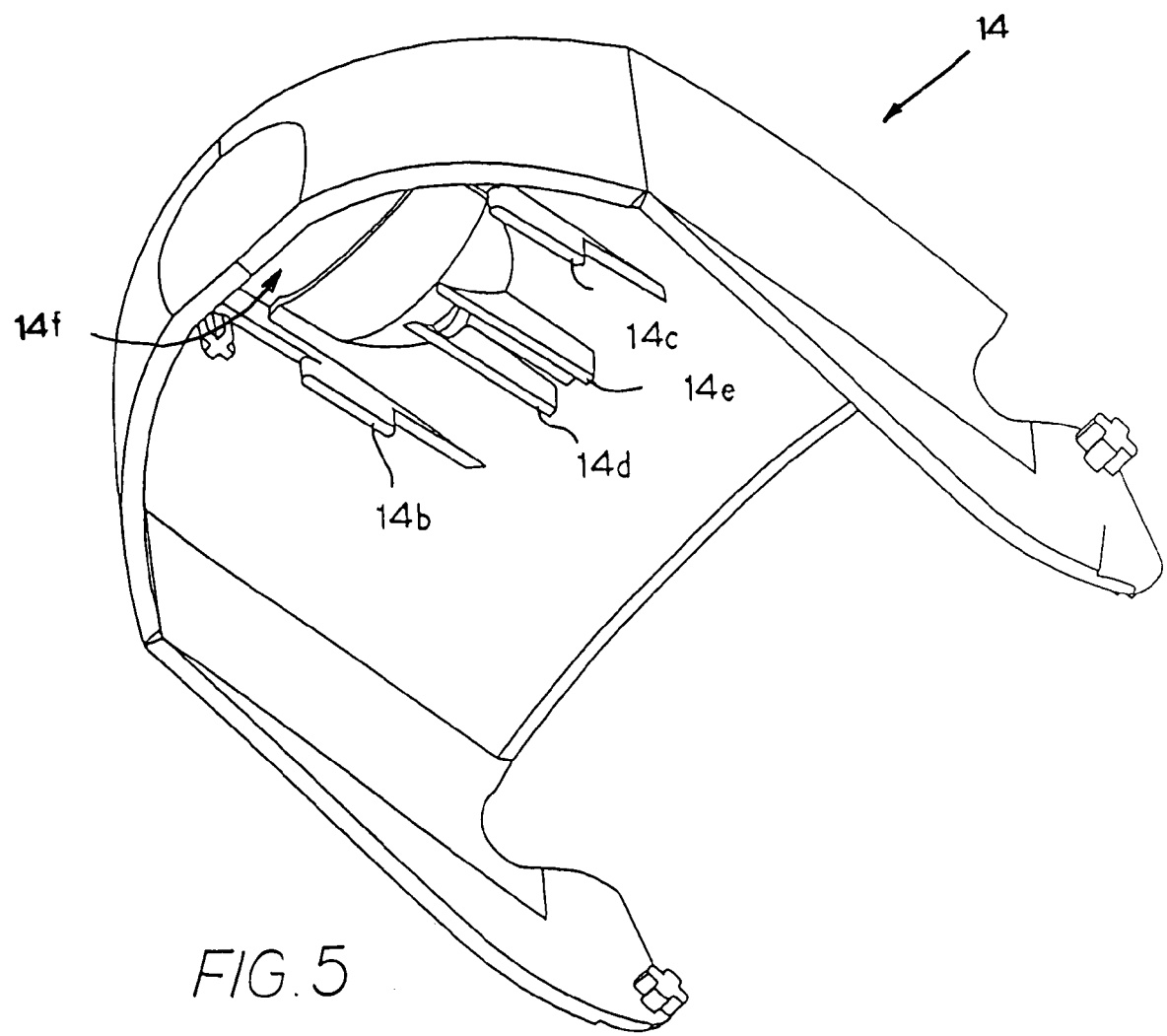
FIG. 5 is a perspective view of the pivotable cover of the exemplary brewer of FIG. 1, illustrating the underside of the pivotable cover where the release slide is received and retained for slidable movement with respect to the cover.
Figure 6:
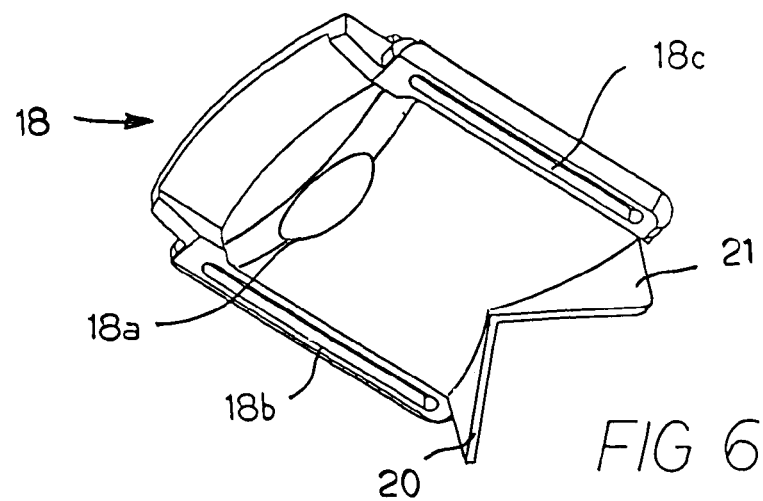
FIG. 6 is a perspective view of the release slide that is secured to the underside of the pivotable cover of FIG. 5.

Referring now to the perspective view of the cover 14 in FIG. 5 and the perspective view of the release slide 18 in FIG. 6, in this exemplary embodiment, the release slide 18 moves forward and rearward relative to the cover 14. Specifically, the release slide 18 has a central body portion 18a, with substantially identical, parallel slots 18b, 18c defined along the lateral edges of this central body portion 18a. On the underside of the pivotable cover 14, there are substantially identical, parallel and elongated bosses 14b, 14c extending downwardly therefrom that mate with and engage the slots 18b, 18c defined by the release slide 18. Accordingly, the release slide 18 is fitted over the bosses 14b, 14c to secure it to the cover 14, but the release slide 18 can move forward and rearward relative to the cover 14 to the extent permitted by the slots 18b, 18c. At the same time, an opening 14f defined through the upper surface of the cover 14 allows for access to and manipulation of the release slide 18, as further described below. Furthermore, referring still to FIGS. 5 and 6, there are also two additional integral projections 14d, 14e, extending from the underside of the cover 14 that define a channel for receiving a spring 15, as illustrated in the sectional view of FIG. 9. Such a spring 15 is used to bias the release slide 18 into a rearward position in which the cover 14 is locked, as also illustrated in the sectional view of FIG. 9.

Figure 7:
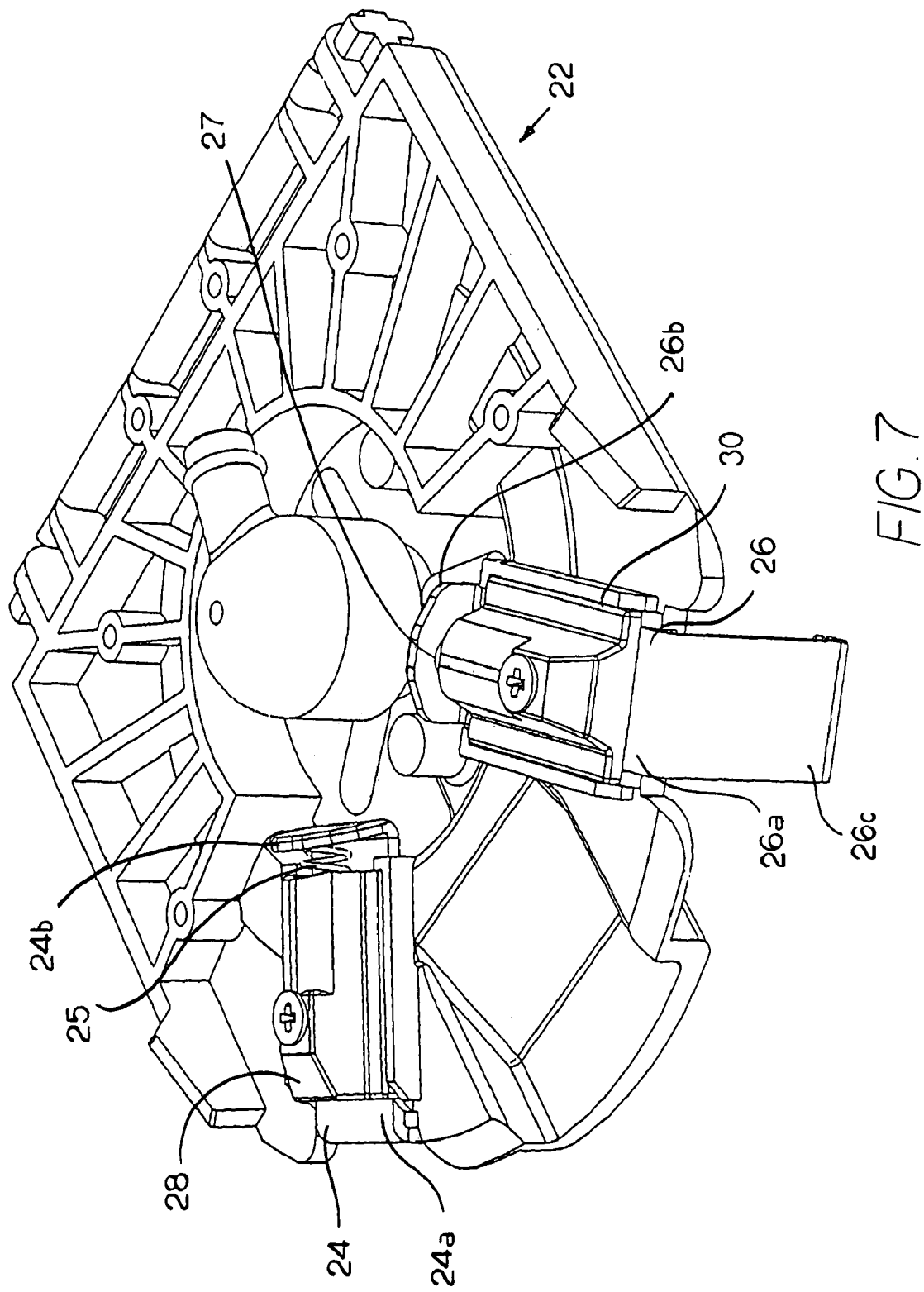
FIG. 7 is a perspective view of the brew head of the exemplary brewer of FIG. 1, illustrating the spring-biased latches secured to the upper surface of the brew head.

Referring again to FIG. 6, the release slide 18 also includes two substantially triangular projections 20, 21 that extend downwardly and away from the underside of the pivotable cover 14 when the release slide 18 is secured to the cover 14. Referring now to FIG. 7, these substantially triangular projections 20, 21 engage two spring-biased latches 24, 26 that are secured to the upper surface of the brew head 22. These two latches 24, 26 are positioned approximately 75° from one another along the forward circumferential edge of the brew head 22. Each latch 24, 26 includes a first, central portion 24a, 26a that lies generally in the plane of the brew head 22 along the upper surface thereof, a second portion—an appendage 24b, 26b extending upwardly from and along one edge of the first portion 24a, 26a; and a third portion—an appendage 24c, 26c extending downwardly from and along an opposite edge of the respective first portion 24a, 26a. The respective central portions 24a, 26a of each latch 24, 26 are retained relative to the brew head by brackets 28, 30 secured to the upper surface of the brew head 22. In this regard, each bracket 28, 30 defines a slot between itself and the upper surface of the brew head 22, with the central portions 24a, 26a of each latch 24, 26 being retained in the slot. Accordingly, the brackets 28, 30 still allow for some forward and rearward movement of each latch 24, 26 with respect to the brew head 22.

The upwardly extending appendages 24b, 26b of the respective latches 24, 26 serve as the engagement surfaces for contact with the two substantially triangular projections 20, 21 that extend downwardly and away from the underside of the pivotable cover 14. Furthermore, there is a spring 25, 27 interposed between the upwardly extending appendages 24b, 26b of each latch 24, 26 and the associated bracket 28, 30, which biases the latches 24, 26 rearwardly and into a "locked" position, as is further described below.

Figure 8:
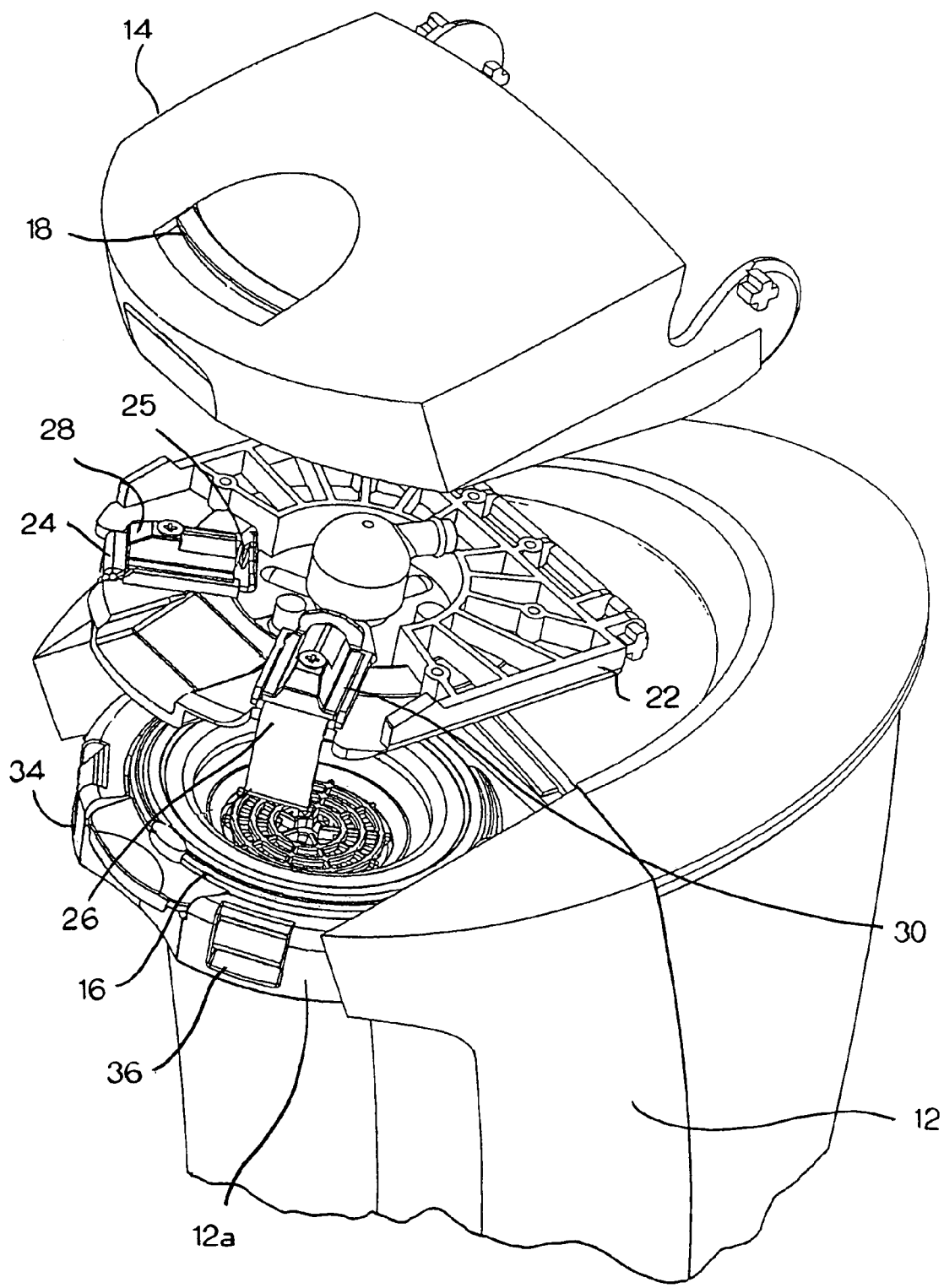
FIG. 8 is a partial, exploded perspective view of the exemplary brewer of FIG. 1, illustrating the assembly of the pivotable cover and the brew head to remainder of the brewer.

Each of the downwardly extending appendages 24c, 26c have a distal end that is adapted to engage a corresponding slot 34, 36 defined by the drawer 12a positioned below the brew head 22. As illustrated in the partial, exploded perspective view of FIG. 8, in this exemplary embodiment, the distal end of each downwardly extending appendage 24c, 26c is bent or hooked to engage the corresponding slot 34, 36 defined by the drawer 12a. Accordingly, by moving the release slide 18 (i.e., causing it to slide forward and toward the user), the two substantially triangular projections 20, 21 are moved and caused to engage the upwardly extending appendages 24b, 26b of the respective latches 24, 26. This movement causes a forward movement of the latches 24, 26 and a disengagement of the downwardly extending appendages 24b, 26b of these latches 24, 26 from the slots 34, 36 defined by the drawer 12a, allowing the cover 14 and brew head 22 to be pivoted rearwardly into an open position. Of course, once the pod has been replaced and the pod holder 16 returned to the drawer 12a of the brewer 10, the cover 14 and brew head 22 can be returned to a closed position. And, because the latches 24, 26 are spring-biased, they will return to the locked position, securing the pod in an appropriate position below the brew head 22. Furthermore, the release slide 18 is similarly biased to returned to a rearward position and locked position.

Figure 9:
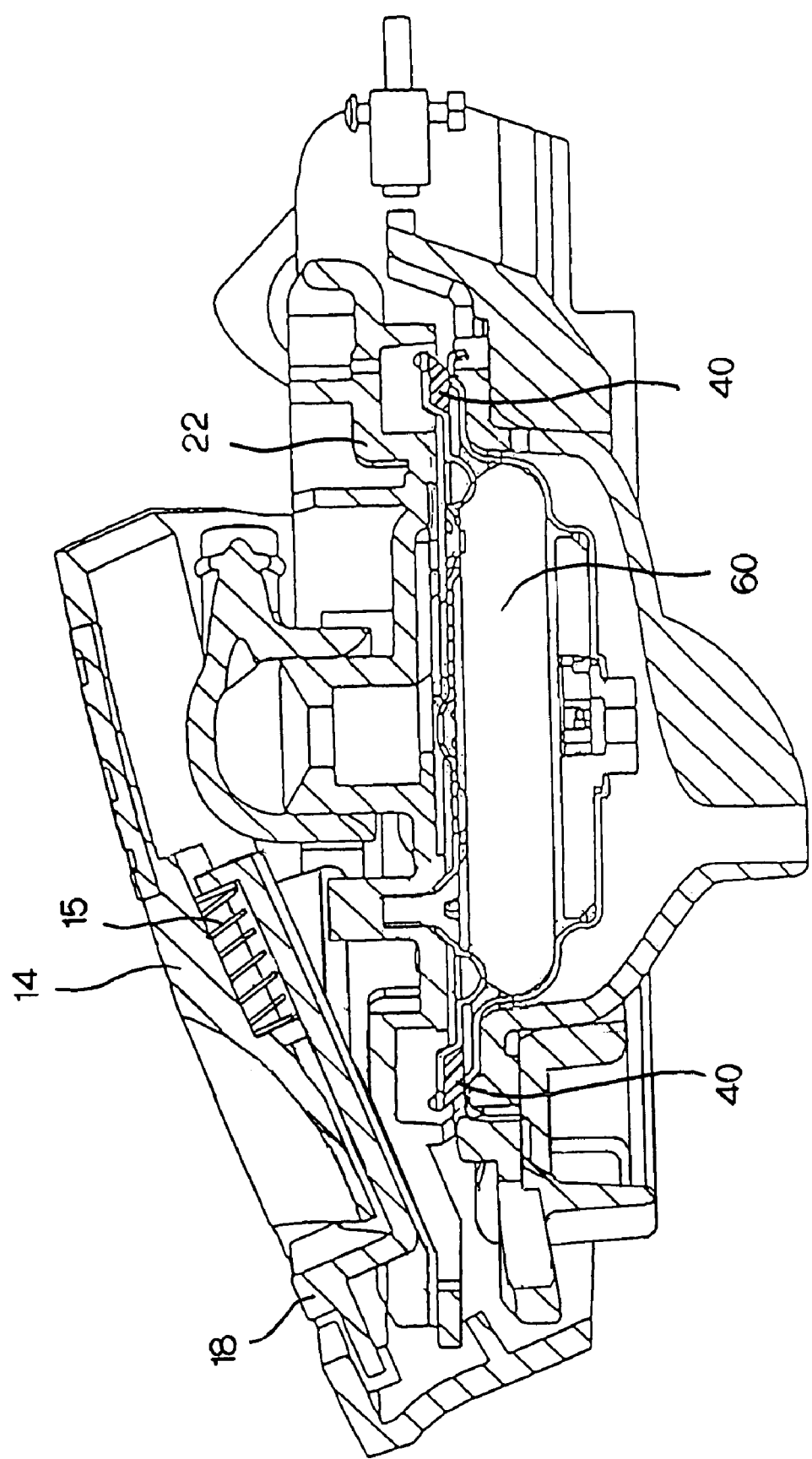
FIG. 9 is a partial sectional view of the exemplary brewer of FIG. 1, illustrating the positioning of the pod within the housing and relative to the brew head when the brew head is in a closed position.

Furthermore, as illustrated in the sectional view of FIG. 9, in this exemplary embodiment, there is a circumferential seal 40 (which may be composed of silicone or a similar compound) secured to the brew head 22. Thus, in the closed position, the brew head 22 and circumferential seal 40 are pressed against the pod holder 16, thus creating a substantially sealed environment between the brew head 22 and the pod holder 16 which serves as a brew chamber. The pod itself is also illustrated in this sectional view and indicated by reference numeral 60.

Finally, as yet a further refinement and referring again to FIGS. 7 and 8, it should be noted that the brew head 22 may include integrally molded stiffening ribs along the upper surface thereof, which increase the structural integrity of the brew head 22 and ensure that the brew head 22 is appropriately sealed against the pod holder 16.

Figure 13:
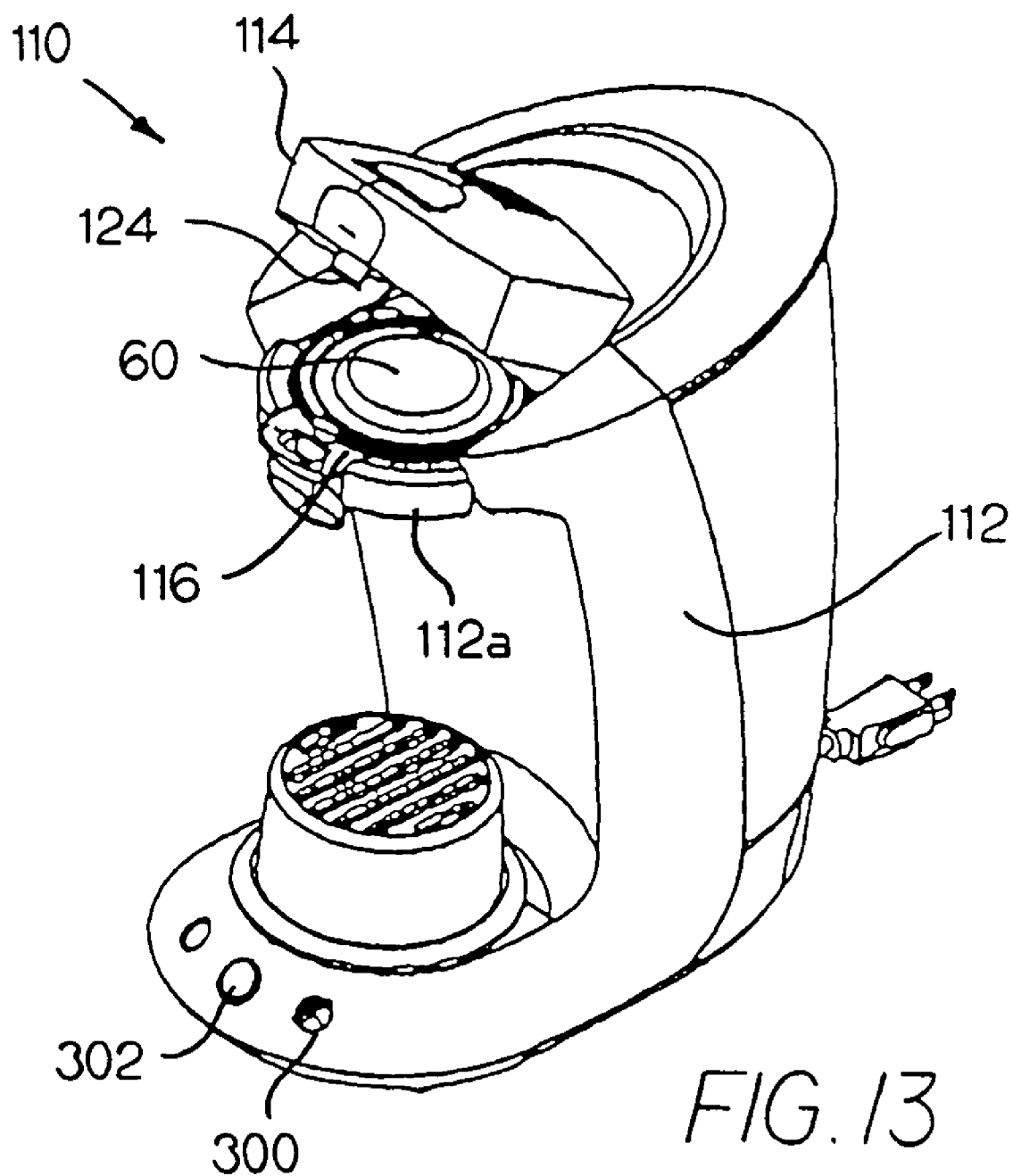
FIG. 13 is a perspective view of the exemplary brewer substantially identical to FIG. 11, but with a pod containing a beverage component received in the pod holder.

Referring now to FIGS. 10–13, another exemplary brewer 110 made in accordance with the present invention similarly has a housing 112 that includes a pivotable cover 114. Opening and pivoting the cover 114, along with the brew head 122 (which is illustrated in FIGS. 16–19 and is secured to and pivots with the cover 114), allows access to a drawer 112a that retains the pod 60 in a pod holder 116 below the brew head 122. As best illustrated in FIG. 12, the drawer 112a defines a substantially circular opening designed to receive the pod holder 116. Accordingly, when the cover 114 is open, the pod holder 116 can be removed from the brewer 110 to replace the pod 60. Once the pod 60 has been placed in the pod holder 116 and the pod holder 116 returned to the brewer 110, as illustrated in FIG. 13, the cover 114 and brew head 122 can be pivoted into a closed position so that the brewing process can commence.

Furthermore, as with the embodiment described above with reference to FIGS. 1–9, the brewer 110 includes a plumbing system, such as that illustrated in the schematic view of FIG. 20. Again, however, the focus of the present invention is not on the plumbing details, but rather on the positioning of the pod 60 below the brew head 122.

Referring still to FIGS. 10–13, in this exemplary embodiment, to open and pivot the cover 114 (and the brew head 122) to gain access to the drawer 112a and pod holder 116 requires an individual to press a release slide 118 on the upper surface of the cover 114.

Figure 14:
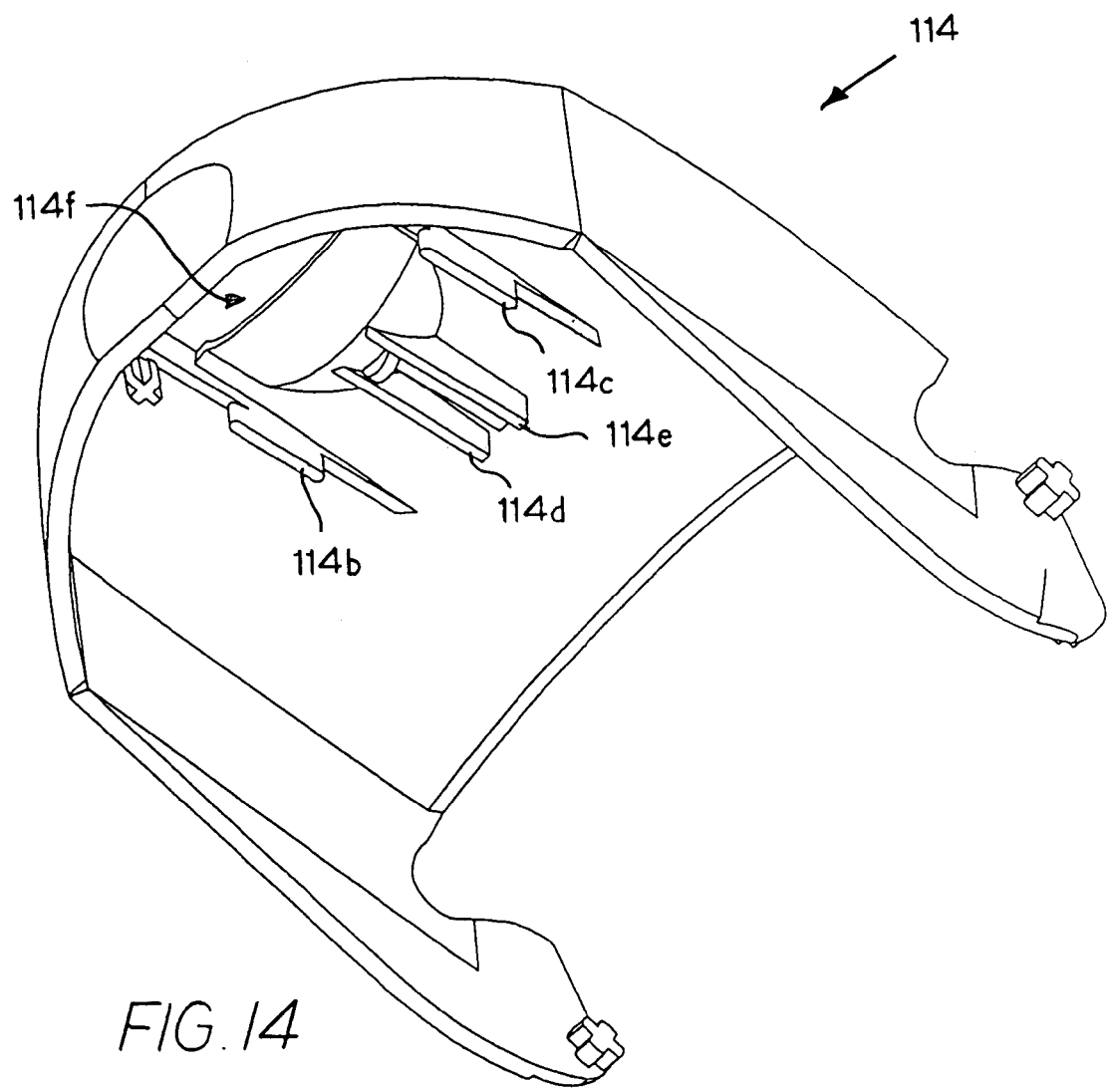
FIG. 14 is a perspective view of the pivotable cover of the exemplary brewer of FIG. 10, illustrating the underside of the pivotable cover where the release slide is received and retained for slidable movement with respect to the cover.
Figure 15:
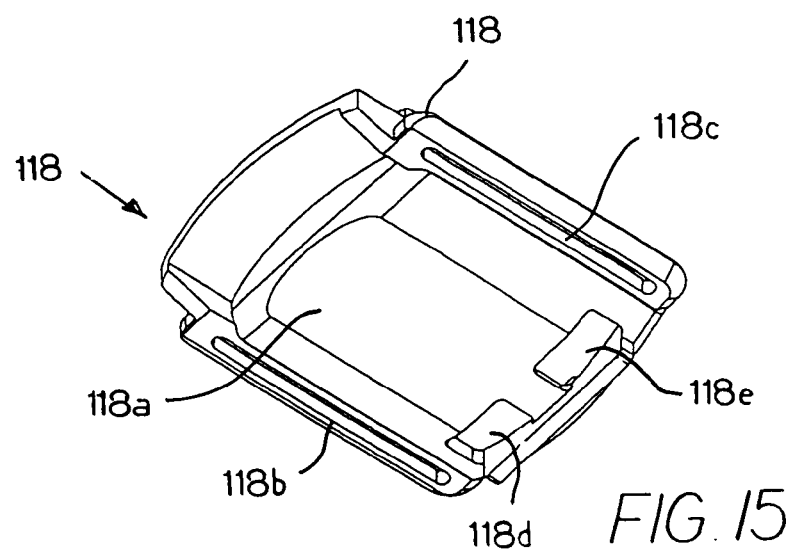
FIG. 15 is a perspective view of the release slide that is secured to the underside of the pivotable cover of FIG. 14.

Referring now to the perspective view of the cover 114 in FIG. 14 and the perspective view of the release slide 118 in FIG. 15, in this exemplary embodiment, the release slide 118 again moves forward and rearward relative to the cover 114. Specifically, the release slide 118 has a central body portion 118a, with substantially identical, parallel slots 118b, 118c defined along the lateral edges of this central body portion 118a. On the underside of the pivotable cover 114, there are substantially identical, parallel and elongated bosses 114b, 114c extending downwardly therefrom that mate with and engage the slots 118b, 118c defined by the release slide 118. Accordingly, the release slide 118 is fitted over the bosses 114b, 114c to secure it to the cover 114, but the release slide 118 can move forward and rearward relative to the cover 114 to the extent permitted by the slots 118b, 118c. At the same time, an opening 114f defined through the upper surface of the cover 114 allows for access to and manipulation of the release slide 118, as further described below. Furthermore, referring still to FIGS. 14 and 15, there are two additional integral projections 114d, 114e, extending from the underside of the cover 114 that define a channel for receiving a spring 115, as illustrated in the sectional view of FIG. 19). Such a spring 115 is used to bias the release slide 118 into a rearward position in which the cover 114 is locked, as also illustrated in the sectional view of FIG. 19.

Figure 16:
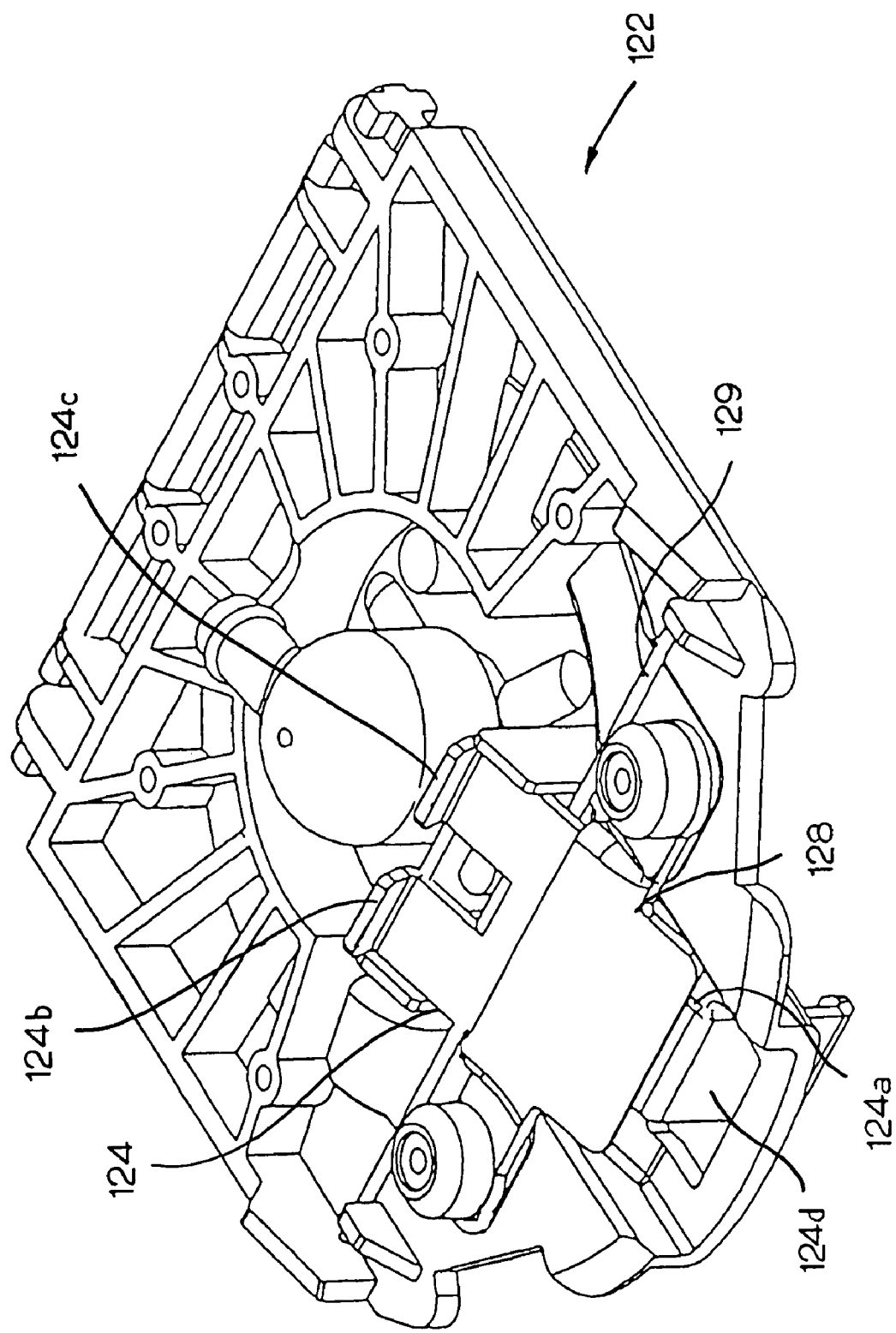
FIG. 16 is a perspective view of the brew head of the exemplary brewer of FIG. 10, illustrating a single spring-biased latch secured to the upper surface of the brew head.
Figure 17:
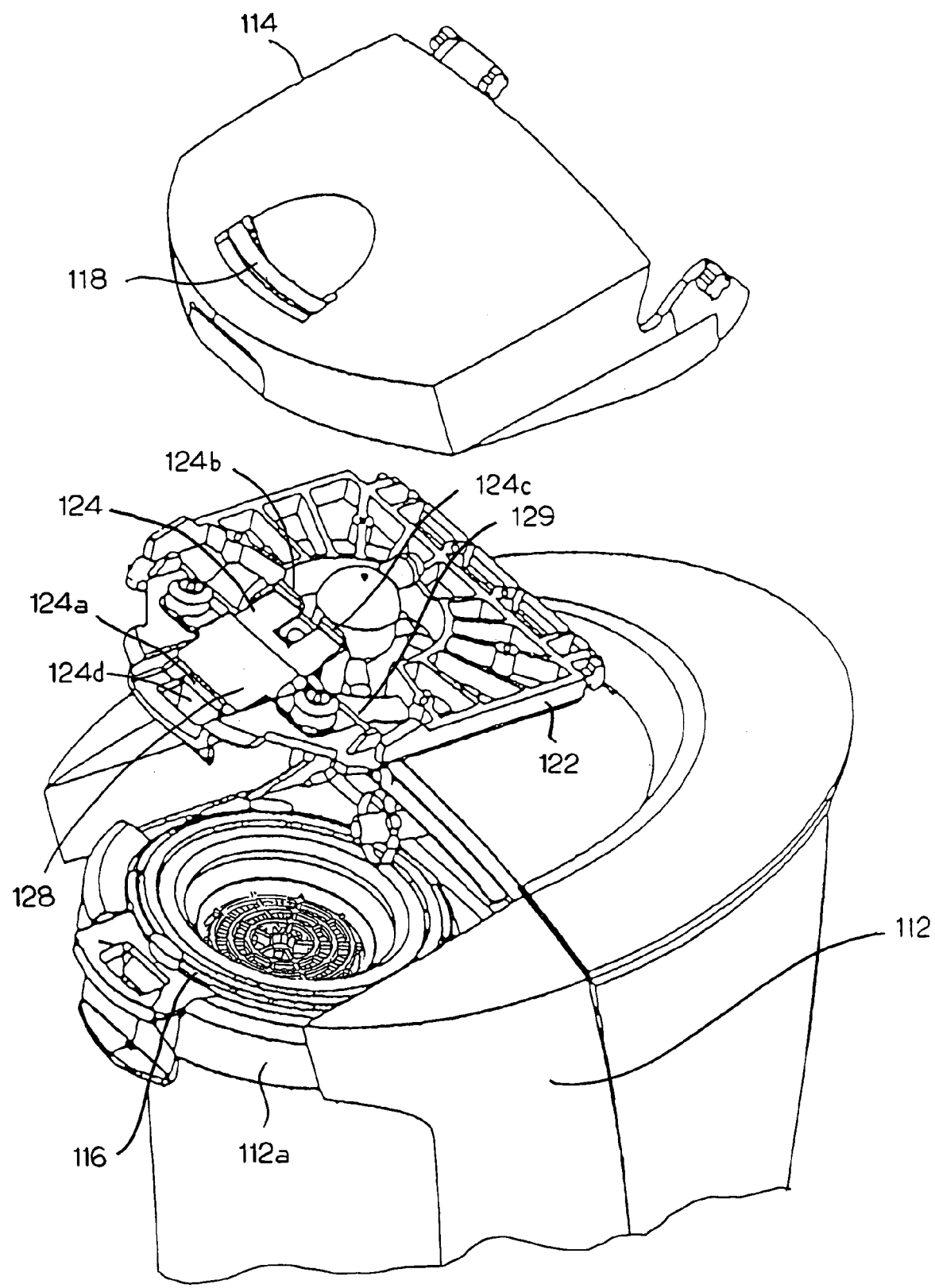
FIG. 17 is a partial, exploded perspective view of the exemplary brewer of FIG. 10, illustrating the assembly of the pivotable cover and the brew head to remainder of the brewer.

FIG. 16 is a perspective view of the brew head 122 of this exemplary brewer 110. Attached to the upper surface of the brew head 122 is a bracket 128, which defines a slot for receiving and retaining a latch 124. This latch 124 includes a first, central portion 124a that lies at an angle relative to the plane of the brew head 122 along the upper surface thereof; a second portion—a pair of appendages extending upwardly from and along one edge of the first portion 124b, 124c; and a third portion—an appendage 124d extending downwardly from and along an opposite edge of the first portion 124a.

With respect to the central portion 124a of the latch 124, a slot is defined between the bracket 128 and the upper surface of the brew head 122. The central portion 124a of the latch 124 is retained in this slot. Accordingly, the bracket 128 still allows for some forward and rearward movement of the latch 124 with respect to the brew head 122. Furthermore, in this exemplary embodiment, the latch 124 is biased into the rearward position by a spring rod 129, which extends through the latch 124, with its distal ends secured to the brew head 122.

Figure 18:
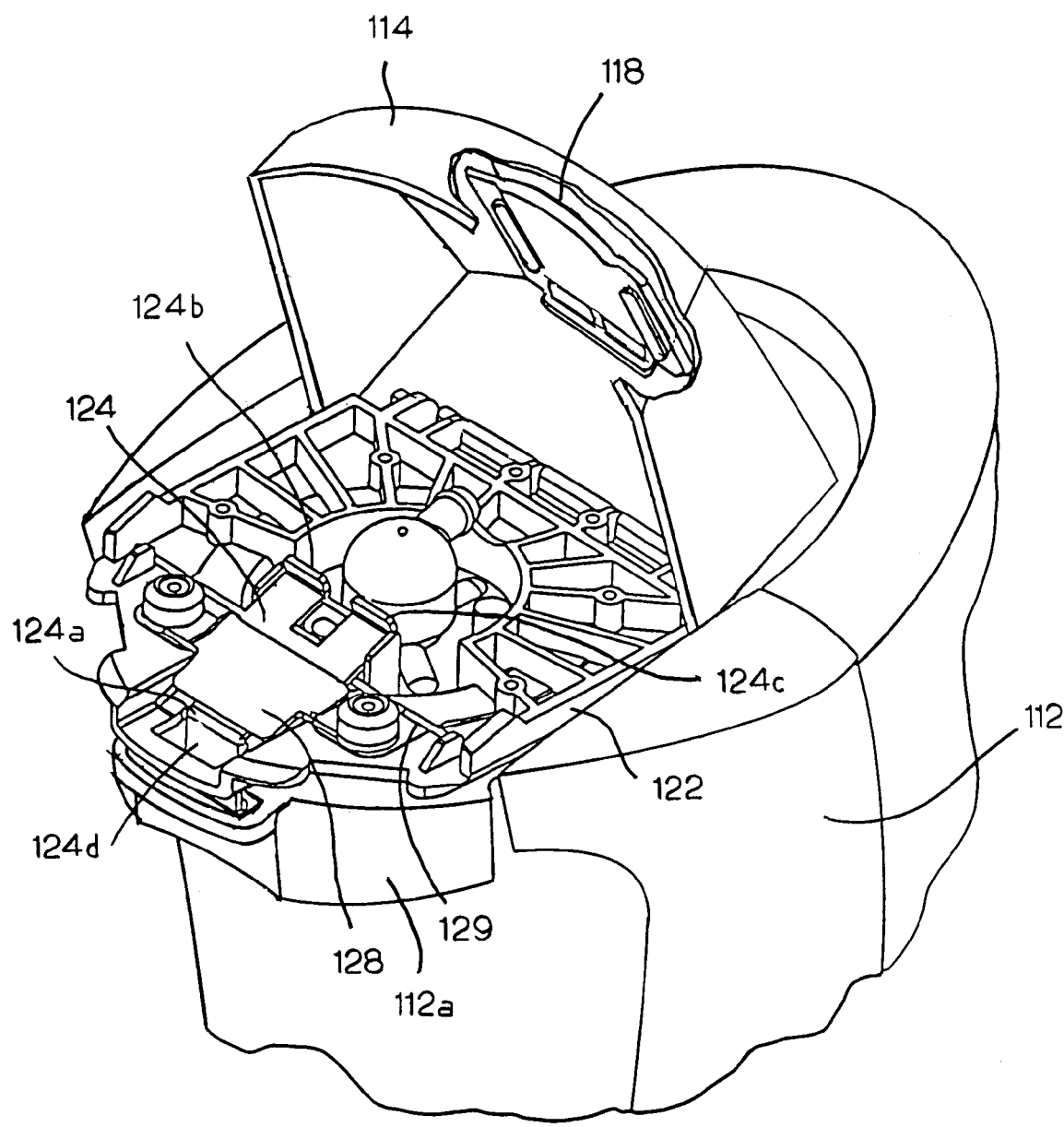
FIG. 18 is a partial perspective view of the exemplary brewer of FIG. 10, illustrating the brew head in a closed position, but with the pivoted away from the brew head to show the underside of the release slide.

The upwardly extending appendages 124b, 124c of the latch 124 engage the release slide 118. Specifically, the release slide 118 also defines two openings 118d, 118e. These two openings 118d, 118e correspond with and are designed to receive the two upwardly extending appendages 124b, 124c of the latch 124, perhaps as best illustrated in FIG. 18.

Figure 19:
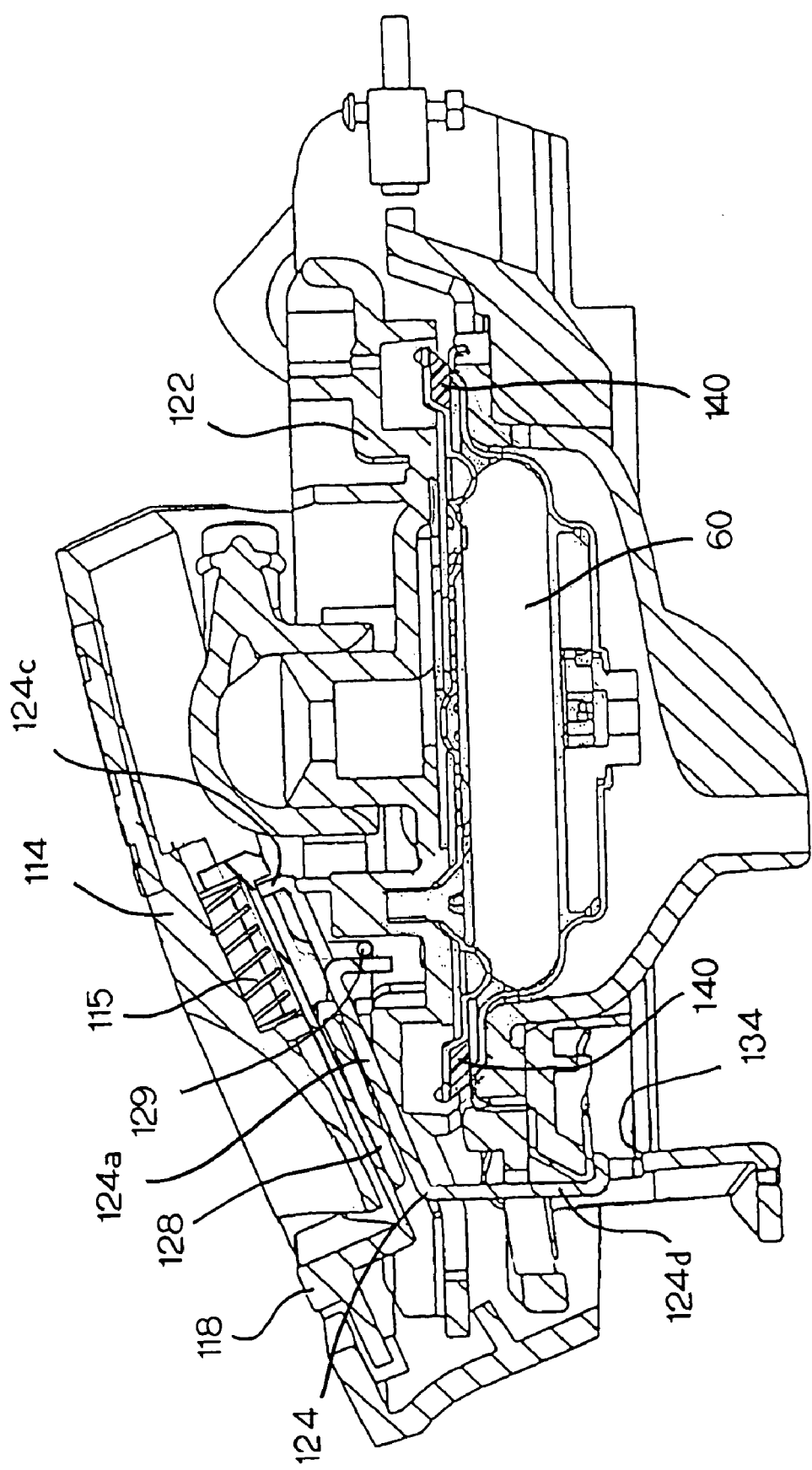
FIG. 19 is a partial sectional view of the exemplary brewer of FIG. 10, illustrating the positioning of the pod within the housing and relative to the brew head when the brew head is in a closed position.

The downwardly extending appendage 124d of the latch 124 has a distal end that is adapted to engage a corresponding slot 134 defined by the drawer 112a positioned below the brew head 122, as illustrated in the sectional view of FIG. 19. Accordingly, as the release slide 118 is manipulated from its biased, rearward position to a forward position, the engagement of the openings 118d, 118e defined by the release slide 118 with the two upwardly extending appendages 124b, 124c of the latch 124 cause a similar movement of the latch 124, such that the downwardly extending appendage 124d of the latch 124 disengages from the drawer 112a and allows the cover 114 and brew head 122 to be pivoted into an open position.

Of course, once the pod 60 has been replaced and the pod holder 116 returned to the drawer 112a of the brewer 110, the cover 114 and brew head 122 can be returned to a closed position. And, because the latch 124 is spring-biased, they will return to a locked position, securing the pod in an appropriate position below the brew head 122. Furthermore, the release slide 118 is similarly biased to returned to a rearward position and locked position.

Furthermore, similar to the embodiment described above with reference to FIGS. 1–9, a circumferential seal 140 (which may be composed of silicone or a similar compound) may be secured to the brew head 122 such that, in the closed position, the brew head 122 and circumferential seal 140 are pressed against the pod holder 116, thus creating a substantially sealed environment between the brew head 122 and the pod holder 116 which serves as a brew chamber.

Finally, as yet a further refinement and referring again to FIGS. 16, 17 and 19, it should be noted that the brew head 122 may include integrally molded stiffening ribs along the upper surface thereof which increase the structural integrity of the brew head 122 and ensure that the brew head 122 is appropriately sealed against the pod holder 116.

One of ordinary skill in the art will also recognize that additional embodiments are possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention

What is claimed is:

1. A brewer, comprising:
   a brew head;
   a plumbing system for delivering hot water to the brew head;
   a housing, including a pivotable cover and a drawer for retaining a pod enclosing a beverage component below the brew head; and
   at least two spring-biased latches positioned along the forward circumferential edge of the brew head and secured to an upper surface of the brew head, each of said latches including a downwardly extending appendage adapted to engage a corresponding slot defined by the drawer of the housing to secure the pivotable cover and brew head to the housing;
   wherein, in an open position, the pivotable cover and brew head are pivoted away from the drawer to allow access to the pod, and in a closed position, the pivotable cover and brew head are pivoted toward and locked relative to the drawer to secure the pod below the brew head for brewing; and wherein the movement of the pivotable cover and brew head from the closed position to the open position requires movement of a release slide, movement of said release slide causing the disengagement of said latches.

2. A brewer, comprising:

a brew head;

a plumbing system for delivering hot water to the brew head;

a housing, including a pivotable cover and a drawer for retaining a pod enclosing a beverage component below the brew head; and at least two latches positioned along the forward circumferential edge of the brew head and secured to an upper surface of the brew head, each of said latches including a downwardly extending appendage adapted to engage a corresponding slot defined by the drawer of the housing to secure the pivotable cover and brew head to the housing;

wherein, in an open position, the pivotable cover and brew head are pivoted away from the drawer to allow access to the pod, and in a closed position, the pivotable cover and brew head are pivoted toward and locked relative to the drawer to secure the pod below the brew head for brewing;

wherein the movement of the pivotable cover and brew head from the closed position to the open position requires movement of a release slide, movement of said release slide causing the disengagement of said latches; and wherein said release slide includes two substantially triangular projections that extend downwardly and away from the underside of said pivotable cover, each of said substantially triangular projections adapted to engage one of said latches such that movement of said release slide causes the disengagement of said latches.

3. The brewer as recited in claim 2, wherein each latch includes a first, central portion that lies generally in the plane of said brew head along the upper surface thereof; an upwardly extending appendage along one edge of the first portion; and the downwardly extending appendage adapted to engage the corresponding slot defined by the drawer of the housing.

4. The brewer as recited in claim 3, wherein the upwardly extending appendages of the respective latches serve as the engagement surfaces for contact with the two substantially triangular projections that extend downwardly and away from the underside of the pivotable cover.

5. A brewer, comprising:

a brew head;

a plumbing system for delivering hot water to the brew head;

a housing, including a pivotable cover and a drawer for retaining a pod enclosing a beverage component below the brew head;

one or more latches secured to an upper surface of the brew head, each of said latches including a downwardly extending appendage adapted to engage a corresponding slot defined by the drawer of the housing to secure the pivotable cover and brew head to the housing; and a bracket attached to the upper surface of the brew head, which defines a slot for receiving and retaining each latch;

wherein, in an open position, the pivotable cover and brew head are pivoted away from the drawer to allow access to the pod, and in a closed position, the pivotable cover and brew head are pivoted toward and locked relative to the drawer to secure the pod below the brew head for brewing; and wherein the movement of the pivotable cover and brew head from the closed position to the open position requires movement of a release slide, movement of said release slide causing the disengagement of said one or more latches.

6. The brewer as recited in claim 5, wherein each said latch includes: a first, central portion that lies along the upper surface of the brew head within the slot; one or more appendages extending upwardly from and along one edge of the first portion; and the downwardly extending appendage adapted to engage the corresponding slot defined by the drawer of the housing.

7. The brewer as recited in claim 6, wherein said release slide defines openings that correspond with and are designed to receive the one or more upwardly extending pair of appendages each latch such that movement of said release slide causes corresponding movement of each latch.

8. The brewer as recited in claim 5, wherein each said latch is spring-biased by a spring rod, which extends through said latch, with its distal ends secured to the brew head.

* * * * *